(12) United States Patent
Miller et al.

(10) Patent No.: US 6,535,734 B1
(45) Date of Patent: Mar. 18, 2003

(54) METHOD AND APPARATUS FOR STEERING MOBILE PLATFORM BEAMS

(75) Inventors: Karl Eric Miller, Chandler, AZ (US); Price Andrew D'Antonio, Phoenix, AZ (US); Curtis Alan Provance, Gilbert, AZ (US); Kenneth Joseph Doerr, Phoenix, AZ (US); Steven Brian Leeland, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/542,608

(22) Filed: Apr. 4, 2000

(51) Int. Cl.[7] .................................................. H04Q 7/20
(52) U.S. Cl. ........................ 455/429; 455/12.1; 342/354
(58) Field of Search ................................. 455/427, 429, 455/12.1, 13.3; 244/158 R; 342/354, 359, 367, 368–377; 370/310, 315

(56) References Cited

U.S. PATENT DOCUMENTS

| | | | | |
|---|---|---|---|---|
| 5,100,084 A | * | 3/1992 | Rahn et al. ................. | 244/165 |
| 6,157,621 A | * | 12/2000 | Brown et al. ............... | 370/310 |

* cited by examiner

*Primary Examiner*—Lee Nguyen
(74) *Attorney, Agent, or Firm*—Ingrassia Fisher & Lorenz (57) ABSTRACT

A method and apparatus for steering beams modulated from a mobile platform in a manner that reduces overall platform payload processing, and therefore payload weight and power requirements. According to the present invention, a beam steering data calculator (64) generates a table of beam steering data sets (60a, 60b), with each data set corresponding to a specific beam-pointing angle mapped to a corresponding cell on the surface of the earth. A data set that corresponds to a received downlink cell address (22a–22e) is read out from the table and mapped to the downlink address, and an output angle of a modulated vehicle beam (16a–16e) that transmits a data packet to the cell address is corrected to correspond to the beam-pointing angle of the read-out data set. The generated table of beam steering data sets (60a, 60b) is then re-used for an application-specific quantization time for mapping subsequently-received downlink addresses with beam steering data sets, thereby obviating the need to provide real-time updates of data sets on a packet transmit interval basis. In addition, the present invention is capable of compensating for numerous other causes of beam-pointing error, thereby improving overall beam-pointing accuracy.

17 Claims, 4 Drawing Sheets

METHOD AND APPARATUS FOR STEERING MOBILE PLATFORM BEAMS

BACKGROUND OF THE INVENTION

1. Field of the Invention

The present invention relates generally to mobile platform communications systems, and particularly to a vehicle or aircraft-based beam steering method and apparatus.

2. Description of Related Art

As the convergence of voice, data and video signals becomes more commonplace, payloads mounted on low earth orbit (LEO) or medium earth orbit (MEO) vehicle platforms and aviation platforms are being increasingly used to provide wireless communication links for surface-based broadband communication devices. A payload so utilized receives data packets transmitted from surface-based devices, with each data packet including a downlink address header corresponding to a surface location below. The payload modulates each data packet onto an electromagnetic communication beam transmitted via a directional antenna to the designated downlink address, thereby effecting a communication downlink.

As the platform moves along its designated orbital path, the payload must steer its modulated beams to account for platform movement and to maintain coverage within the mobile platform's antenna field of view. Conventional payload-based beam steering systems generate beam angle data sets on the fly, i.e., in real-time, for each downlink data packet received by the payload. In this processing, the downlink address in each packet header is mapped to a specific angle data set that provides the optimum beam-pointing angle for communicating that packet of information to the designated downlink address. The data set is then utilized to steer the corresponding modulated beam to ensure accurate transmission of the particular data packet to the downlink address.

However, the real-time beam steering systems of the type described above have certain limitations. For example, because payloads link high bandwidth systems, and because an angle data set must be generated for each data packet received by the payload, the real-time beam steering approach is computationally intensive, and thus overall payload hardware and power requirements are significant. For example, payload modulation of 16 beams during a 2 $\mu$s burst period would require beam steering data to be calculated at a rate of 8 million data sets per second.

In addition, the high computational processing required for real-time beam steering systems typically limit the ability to compensate for variables such as earth oblateness, RF beam profile variances, vehicle pitch, yaw and roll deviations, orbit eccentricities, electrical and mechanical antenna pointing offsets, downlink target elevation and beam radiation pattern errors. Such variables contribute to a generalized composite error function that tends to increase in proportion to the nadir angle, which is the angle between a nadir vector (a vector formed between the vehicle and a surface point directly below the vehicle relative to the Earth's center) and the beam-pointing vector. Therefore, the accuracy of the resulting data sets used for beam steering may be limited to a certain degree, particularly when a downlink address is located near an outer limit of the antenna radiating field of view and therefore creates a large nadir angle.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
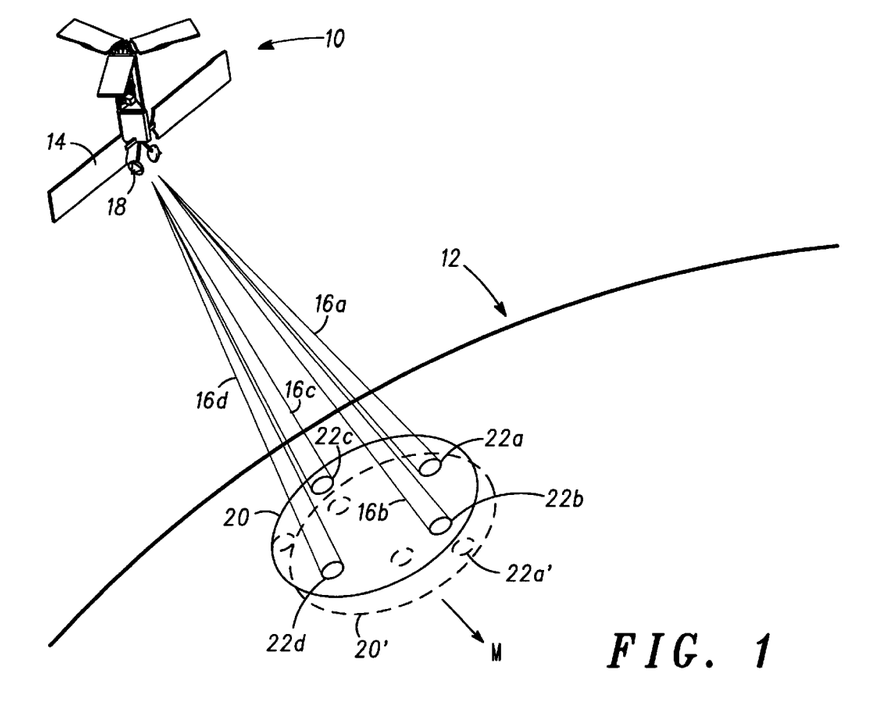
FIG. 1 is a perspective view of a vehicle-mounted payload of the type that includes a beam steering method and apparatus according to a preferred embodiment of the present invention.

FIG. 1 illustrates a vehicle 10 in orbit above the surface of a planetary body or the earth 12. The vehicle 10 shown is of the space-based, low earth orbit (LEO) type, but could be any mobile emitter not on the surface of the earth such as an airplane or a remote piloted vehicle. The vehicle 10 carries a high-bandwidth payload 14 that generates and modulates communications beams 16a–16d from a vehicle emitter 18, such as, but not limited to, a conventional phased-array antenna As the vehicle moves along its orbital path in a direction indicated by the arrow M, it receives data packets transmitted from cellular phones, home or corporate wireless internet access devices, and/or other types of broadband communication devices requesting downlinks to like devices within a radiating field of view (FOV) 20 of the emitter 18.

To provide the requested downlinks, the payload 14 is programmed to tile the surface of the earth 12 within the FOV 20 into individual cells, or geographic location areas (GLAs), as exemplified by cells 22a–22d, and as will be described later in more detail.

Coverage of the cells 22a–22d by the beams 16a–16d changes constantly as the vehicle moves along its orbital path. For example, as shown in FIG. 1, as the vehicle orbits along its path as indicated by the arrow M, the antenna FOV 20 shifts, to a new FOV indicated by FOV 20'. Consequently, some cells, such as cell 22c, are lost as beam coverage shifts to the FOV 20', while other cells, such as cell 20a', are gained. It should be noted that all cells within the platforms FOV move continuously with respect to the platform.

In addition, the beam pointing angles are also updated in response to data packet traffic. For example, at a specific point in time corresponding to the FOV 20, the beam 16*a* may be pointed to cover cell 22*a*, while the beam 16*d* may be pointed to cover the cell 22*d*. However, in accordance with the beam steering device of the present invention, when beam coverage shifts to FOV 20', any beam 16*a*–16*d* may be re-pointed to the cell 22*a'*, while any other beam 16*a*–16*d* may be re-pointed to cell 22*d'*. As will be later described in detail, the beam steering device of the present invention re-points the beams by transforming each downlink address specified in a received data packet header to earth-based beam-pointing coordinates, and then steers each of the beams to the center of a cell corresponding to one of the specified downlink addresses.

Figure 2:
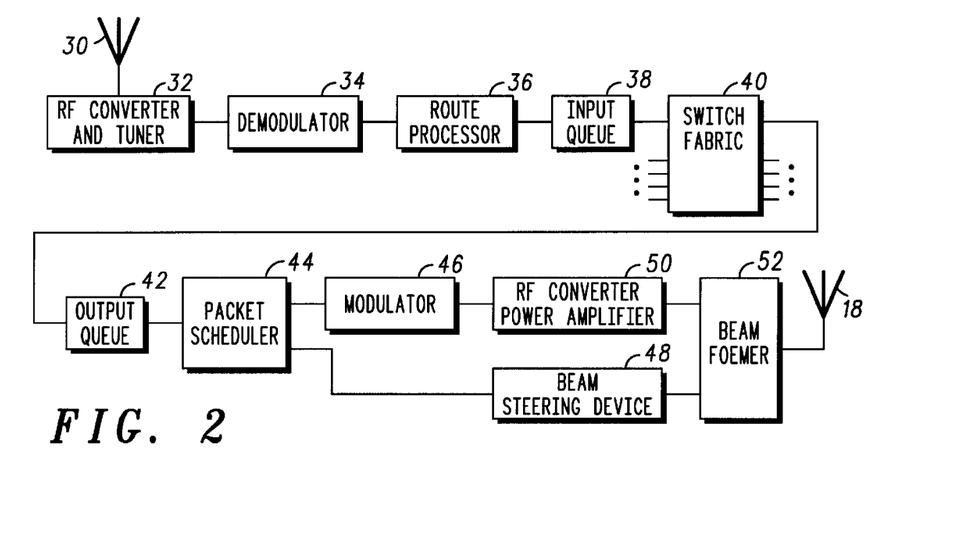
FIG. 2 is a block diagram of the hardware and software components of the payload shown in FIG. 1, including the hardware and software components of the beam steering method and apparatus of the present invention.

FIG. 2 shows the components of a typical vehicle payload such as the payload 14. Data packets to be downlinked are input to the payload through a receiving antenna 30. The received data packets are then processed by an RF converter and tuner 32 before being demodulated by a demodulator 34. Subsequently, the data packets are appropriately tagged by a route processor 36 before being queued in an input queue 38 and then forwarded or routed by a switch fabric device 40. After being routed by the switch fabric device 40, the packets are queued in an output queue 42 before being output to a packet scheduler 44. The packet scheduler 44 reviews the header tag of each data packet and determines the optimum order of transmission and the optimum assignment of packets for the appropriate transmission resources before forwarding the data packet to the appropriate modulator 46 and to the beam steering device 48 of the present invention.

The modulator 46 transmits the packet to the RF conversion power amplifier 50. The amplifier 50 then amplifies the modulated data packet and outputs the resulting signal to the beam former 52. The beam former 52 then generates RF beams directed to the centers of the respective cells specified by the beam steering data derived from the associated packet header by the beam steering device 48.

Figure 3:
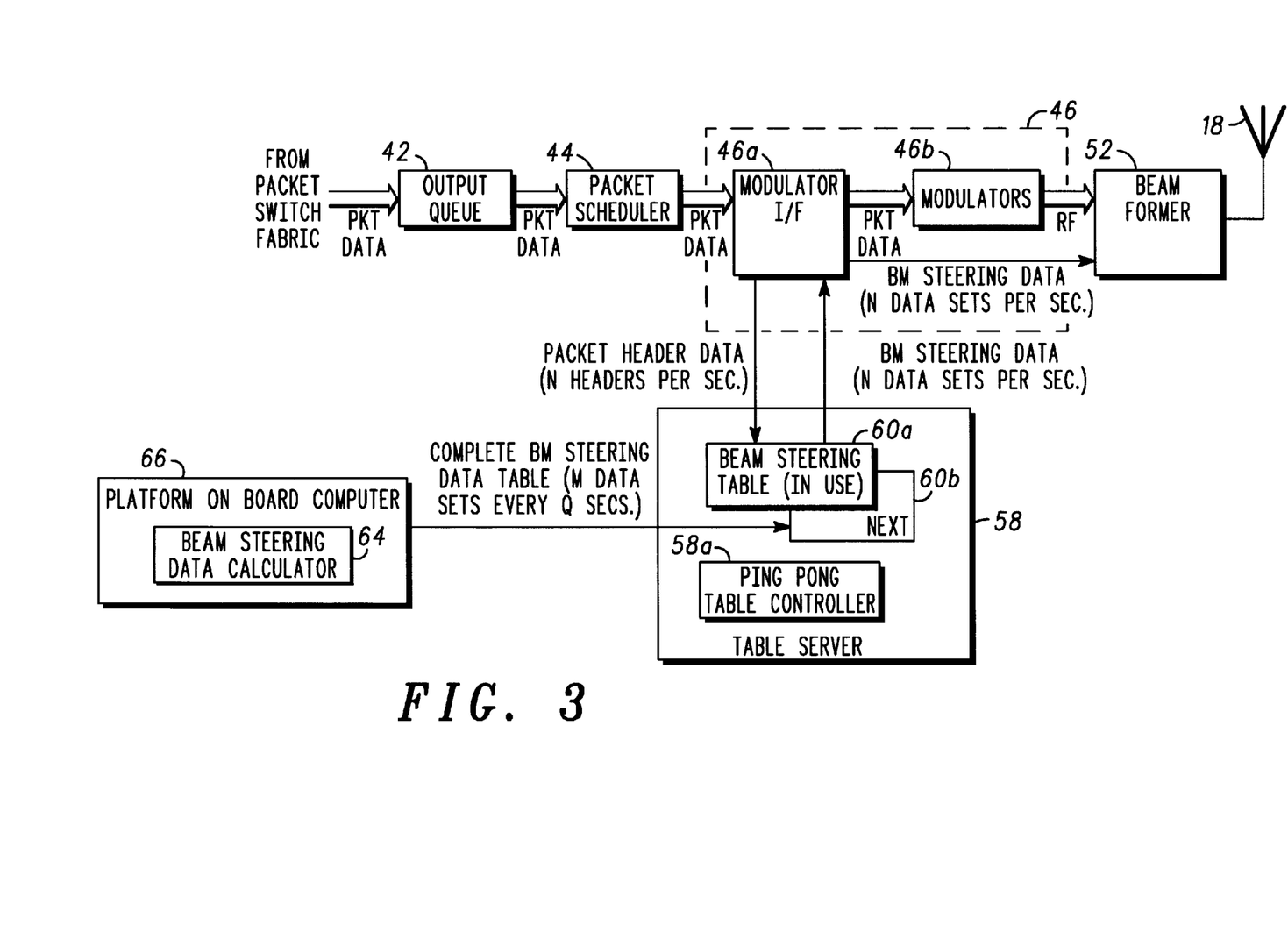
FIG. 3 is a more detailed block diagram of the hardware and software components of the beam steering method and apparatus of the present invention shown in FIG. 2.

As shown in more detail in FIG. 3, the beam steering device 48 includes a table server 58 in which beam-steering lookup tables, such as tables 60*a*, 60*b*, are arranged for providing a fast lookup of beam coordinates on a packet-by-packet basis. The table server 58 provides coordinated access between a modulator interface 46*a*, which, in combination with a plurality of individual packet modulators 46*b*, forms the modulator 46 in FIG. 2, and a beam steering data calculator 64, which is implemented by software loaded into a platform onboard computer 66.

According to one embodiment of the present invention, the modulator interface 46*a* is capable of looking up 8 beam steering angles every 2.6 µs, while the beam steering data calculator is capable of writing up to 22,000 data set entries every 0.25 seconds. However, while these processing parameters are only for a preferred embodiment of the present invention, actual processing times will be application specific. In addition, the table server 58 provides the payload with error checking and correction capability to ensure reliable access to external table RAMs (not shown) that store the array of data set entries in the event of a radiation-effect single event upset.

Preferably, each beam steering table is approximately M sets of beam steering coefficients, or beam steering data sets, for input to the beam former 52. The beam former 52 then applies these data sets to the beam forming signal processing, where M is the total number of possible allowed active beam-pointing locations in the platform's FOV during a single quantization interval. In the example shown in FIG. 3, the table 60*a* contains beam steering data sets generated by and input from the beam steering data calculator 64 for lookup access by the modulator interface 46*a* during a single quantization interval. In other words, each table generated by the beam steering data calculator is re-used for an application-specific period of time to map beam steering data to data packets based on the downlink addresses in the packet headers.

For example, taking one application with a 5.8 km/sec tracking speed for the payload, an update rate of approximately 4 times/sec has been determined to be an acceptable beam angle re-adjustment rate with an acceptable computational load to compensate for vehicle movement. Such an update rate yields a contribution to error budget of 0.006 degrees, or 1.45 km, due to the resultant update latency. As a result, the beam steering device of the present invention obviates the need for a new data set to be generated for each incoming data packet at the high output rate, as is necessary with conventional real-time beam steering systems, while at the same time satisfying required system accuracy parameters.

Still referring to FIG. 3, once the quantization interval has expired, the table server 58 replaces the table 60*a* with a table having updated data sets, such as the table 60*b*. The table server 58 includes a ping-pong type controller 58*a* that enables the server to handle header to beam steer data lookup for packet traffic via table 60*a* while simultaneously updating table 60*b* by the beam steering data calculator 64. Depending upon the requirements of a particular application, the beam steering device of the present invention may be configured to have a table associated with each beam channel. Alternatively, the device of the present invention may be configured to have a common server for all channels.

As should be appreciated from the above description, the beam steering device of the present invention balances beam steering data set update rates with latency error compensation caused by beam steering table use for more than one data packet. The resulting beam-pointing accuracy remains high, because high data rate systems, such as those in which the present invention is utilized, have small associated delta time between packets requiring beam steering coefficient sets. The described invention exploits this small delta time by trading off quantization in the time domain with slightly increased beam pointing error due to position information latency or quantization error.

Figure 4:
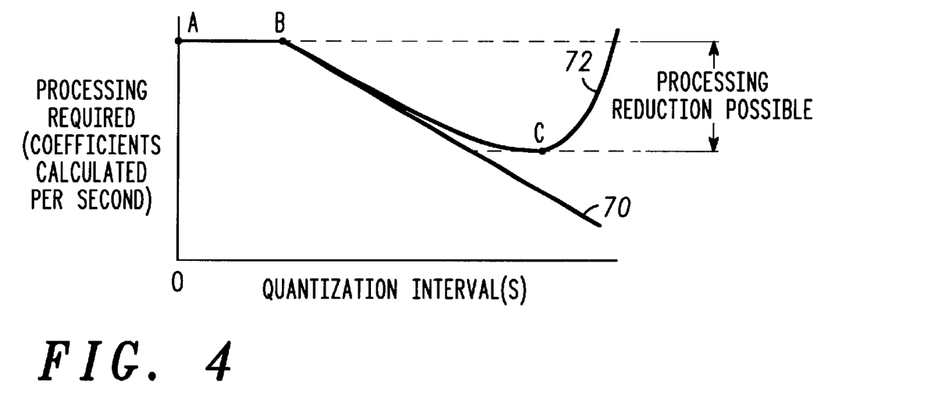
FIG. 4 is a graph of quantization interval length versus required processing for the payload shown in FIG. 1.

A generalized graph illustrating this trade-off is shown in FIG. 4. The curve 70 represents processing required as a function of quantization interval, excluding the processing cost incurred to recover quantization error, which is the error caused by beam steering table re-use. The curve 72 represents the same required processing as curve 70, but also includes the processing cost which must be incurred to recover quantization error. Point A represents the processing needed along both curves at a quantization interval of zero, or, in other words, real-time coefficient calculation processing. Point B is the point in the curves 70, 72 where the required processing needed to completely fill one ping pong beam steering table in the quantization interval is equal to the required processing to calculate a separate beam steering data set for each packet in real time during the same quantization interval. Specifically, at point B, the processing required to a-priori calculate the beam steering coefficients across all possible beam steering positions at a given quantization interval becomes less than the processing required to calculate, in real-time, a beam steering coefficient set for each and every packet. Point C is the optimum quantization interval along the curve 72 at which the maximum processing reduction is achieved.

Still referring to FIG. 4, the following example emphasizes the reduction in processing realized by the beam steering device of the present invention. If the full system packet processing rate is 4 million packets per second and there are a total of 30 thousand beam cells, or beam-pointing positions, within a FOV, point A represents processing required at a rate of 8 million coefficient sets per second. Point C, however, represents an optimum quantization interval of 0.25 seconds as utilized by the present invention and as required for processing 120K coefficient sets per second. Therefore, the beam steering device of the present invention realizes a reduction in processing of around 67×.

In addition to compensating for vehicle orbital movement as discussed above, the beam steering device of the present invention is also capable of compensating for several other error effects through the use of techniques that will now be discussed in detail. The beam steering data calculator 64 includes error compensation for the causes of error (discussed below) during the generation of beam steering table data sets in a manner that does not significantly add to the overall processing of the beam steering data calculator 64.

Space Vehicle Pitch, Roll and Yaw Compensation

Figure 5:
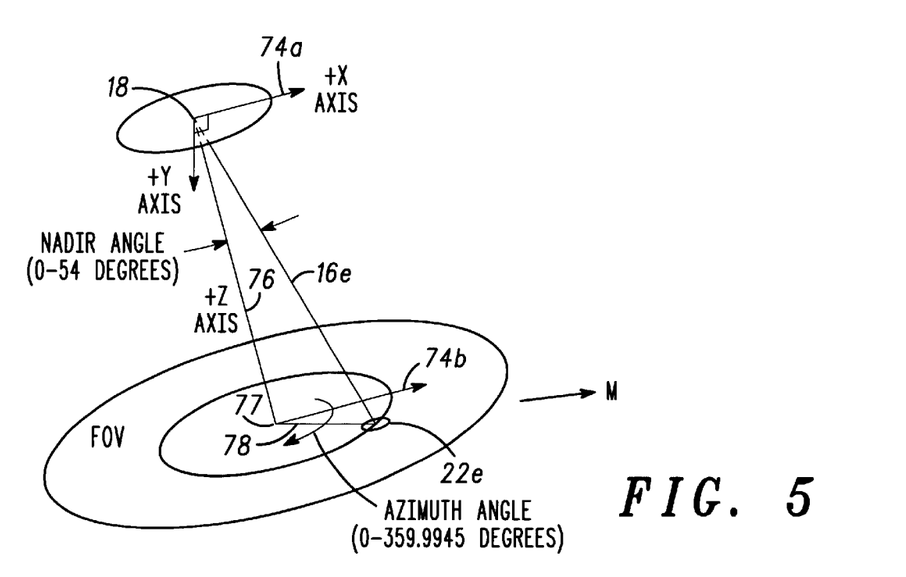
FIG. 5 is schematic diagrams that illustrate the vectors and angles used by the beam steering method and apparatus of the present invention to transform surface coordinates received by the payload into corrected beam steering coordinates.
Figure 6:
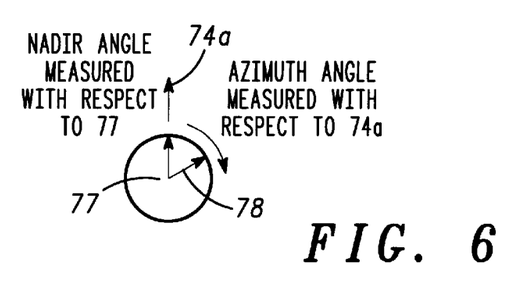
FIG. 6 is schematic diagrams that illustrate the vectors and angles used by the beam steering method and apparatus of the present invention to transform surface coordinates received by the payload into corrected beam steering coordinates.

Referring now to FIGS. 5–6, compensation by the beam steering data calculator 64 for pitch, roll and yaw of the vehicle will now be discussed. In generating the above-described data sets, the beam steering data calculator 64 is programmed to utilize an antenna plate mechanical reference vector 74a (which may or may not coincide with the vehicle velocity vector 74b) as the reference X axis, and a vector between the antenna and the nadir point 77 as the Z axis, with the Y axis being set as orthogonal to both the X and Z axes. The beam steering data calculator 64 is also programmed with an algorithm that factors in the latitude and longitude of the payload nadir pointing position 77. From this information the calculator 64 can easily determine the area of the earth covered within the platform's FOV 20. Furthermore, knowing the application specific method for tiling the earth with the fixed GLAs, the calculator can build a table of all latitude and longitude sets for each GLA in the FOV. The beam steering data calculator uses the following equations to generate compensation data for each beam and cell, such as beam 16e and cell 22e in FIG. 5, within the FOV.

Initially, the data calculator 64 calculates vehicle-to-earth and earth-to-cell vectors 76, 78 from the following Eqns. (1) and (2).

$$\begin{bmatrix} \text{sv\_to\_earth\_}\hat{x} \\ \text{sv\_to\_earth\_}\hat{y} \\ \text{sv\_to\_earth\_}\hat{z} \end{bmatrix} = \begin{bmatrix} 0 \\ 0 \\ h_{sv} + R_n \end{bmatrix} \quad \text{Eqn. (1)}$$

$$\begin{bmatrix} \text{earth\_to\_gl\_}\hat{x} \\ \text{earth\_to\_gl\_}\hat{y} \\ \text{earth\_to\_gl\_}\hat{z} \end{bmatrix} = \begin{bmatrix} \cos\Delta L\cos\Delta\delta & -\sin\Delta L\cos\Delta\delta & \sin\Delta\delta \\ 0 & \cos\Delta L & 0 \\ -\cos\Delta L\sin\Delta\delta & \sin\Delta\delta\sin\Delta L & \cos\Delta\delta \end{bmatrix} R_{GLA} \quad \text{Eqn. (2)}$$

In Eqn. (1), $h_{sv}$ is the altitude of the satellite above the surface of the earth as measured at the nadir point (intersection of the vehicle Z axis and the surface of the earth). This value is not constant and depends not only on the irregular shape of the earth, but also on the motion of the vehicle due to gravity fluctuations, solar wind, and other effects.

Also in Eqn. (1), $R_n$ is the radius of the earth at the vehicle nadir point. This is not a constant value and depends not only on the oblate shape of the earth, but also on the average height of the landmass (or ocean surface) corresponding to the cell area.

In Eqn. (2), $\Delta L$ is the difference (in radians) between the longitude of the cell and the longitude of the nadir point of the vehicle where it intersects the surface of the earth. Also, $\Delta\delta$ is the difference (in radians) between the latitude of the cell and the latitude of the nadir point of the vehicle where it intersects the surface of the earth. In addition, $R_{GLA}$ is the radius of the earth at the cell. $R_{GLA}$ is not a constant value, and depends not only on the oblate shape of the earth, but also on the average height of the landmass (or ocean surface) in the cell area.

Subsequently, as shown in Eqn. (3), a desired beam-pointing angle is generated by adding the results of Eqns. (1) and (2).

$$\begin{bmatrix} \text{beam\_}\hat{x} \\ \text{beam\_}\hat{y} \\ \text{beam\_}\hat{z} \end{bmatrix} = \begin{bmatrix} \text{sv\_to\_earth\_}\hat{x} \\ \text{sv\_to\_earth\_}\hat{y} \\ \text{sv\_to\_earth\_}\hat{z} \end{bmatrix} + \begin{bmatrix} \text{earth\_to\_gl\_}\hat{x} \\ \text{earth\_to\_gl\_}\hat{y} \\ \text{earth\_to\_gl\_}\hat{z} \end{bmatrix} \quad \text{Eqn. (3)}$$

In Eqn. (3), sv_to_earth and earth_to_gl vector components represent the spatial relationship between the referenced objects as would be measured in a Cartesian reference frame having a Z axis parallel with a line from the vehicle to the center of the earth, and having an X axis parallel with the velocity of the vehicle.

Once the beam steering data calculator 64 has generated the desired beam-pointing angle, it compensates for vehicle pitch, roll and yaw by generating a corrected beam steering angle as shown in Eqn. (4).

$$\begin{bmatrix} \hat{x} \\ \hat{y} \\ \hat{z} \end{bmatrix} = \begin{bmatrix} \cos\phi_p\cos\theta_r\cos\psi_y - \sin\phi_p\sin\psi_y & -\sin\phi_p\cos\theta_r\cos\psi_y - \cos\theta_r\sin\psi_y & \sin\theta_r\cos\psi_y \\ \sin\phi_p\sin\psi_y + \cos\phi_p\cos\theta_r\sin\psi_y & -\sin\phi_p\cos\theta_r\sin\psi_y + \cos\phi_p\cos\psi_y & \sin\theta_r\sin\psi_y \\ -\cos\phi_p\sin\theta_r & \sin\theta_r\sin\phi_p & \cos\theta_r \end{bmatrix} \begin{bmatrix} \text{beam\_}\hat{x} \\ \text{beam\_}\hat{y} \\ \text{beam\_}\hat{z} \end{bmatrix} \quad \text{Eqn. (4)}$$

In Eqn. (4), $\phi_p$ is the pitch angle of the emitter 18. This is the angle in the vehicle XZ plane between what the vehicle registers as a '0' angle, and the actual (nadir) '0' angle (denoted as the +Z axis in FIG. 5). Further, $\theta_r$ is the roll angle of the antenna 18, or the angle in the vehicle YZ plane between what the satellite registers as a '0' angle, and the actual (nadir) '0' angle (denoted as the +Z axis in FIG. 5A). In addition, $\psi_y$ is the yaw angle of the antenna 18, or the angle in the vehicle XY plane between the axis of the vehicle intended to be parallel to the vehicle velocity vector and the actual velocity vector (denoted as the +X axis in FIG. 5A).

After the beam steering data calculator determines the corrected beam-pointing angle, it calculates the nadir and azimuth angles necessary to realize the corrected beam-pointing angle through Eqns. (5) and (6).

$$nadir = \cos^{-1} \frac{\hat{z}}{\sqrt{\hat{x}^2 + \hat{y}^2 + \hat{z}^2}} \quad \text{Eqn. (5)}$$

$$azimuth = \tan^{-1} \frac{\hat{y}}{\hat{x}} \quad \text{Eqn. (6)}$$

As shown in the elevation view in FIG. 6, the nadir and azimuth angles are calculated for each cell within the antenna FOV 20 from Eqns. (5) and (6), and are input to beam steering data tables, such as tables 60a and 60b, for beam steering purposes.

Earth Oblateness Compensation

Basic calculations involving the interaction of two objects always begin with the assumption that both objects may be represented as point objects. For most calculations involving a mobile emitter above the earth's surface, such assumptions are adequate to predict the vehicle position and velocity vectors with a suitable degree of accuracy. However, when the interaction in question is a vector from the mobile emitter to a point on the surface of the earth, the above basic assumptions may be much too coarse, as the required pointing accuracies required of conventional vehicles, for example, are in the fractions of a degree.

If the earth was a perfect sphere, the distance and angle from a mobile emitter to any surface point could be calculated fairly easily using known spherical trigonometric relations. Such calculations could be performed assuming that the vehicle nadir point and distance from center of the earth may be calculated using Kepler's Laws of Motion and that the radius of the earth is constant and well known.

Figures 7, 8:
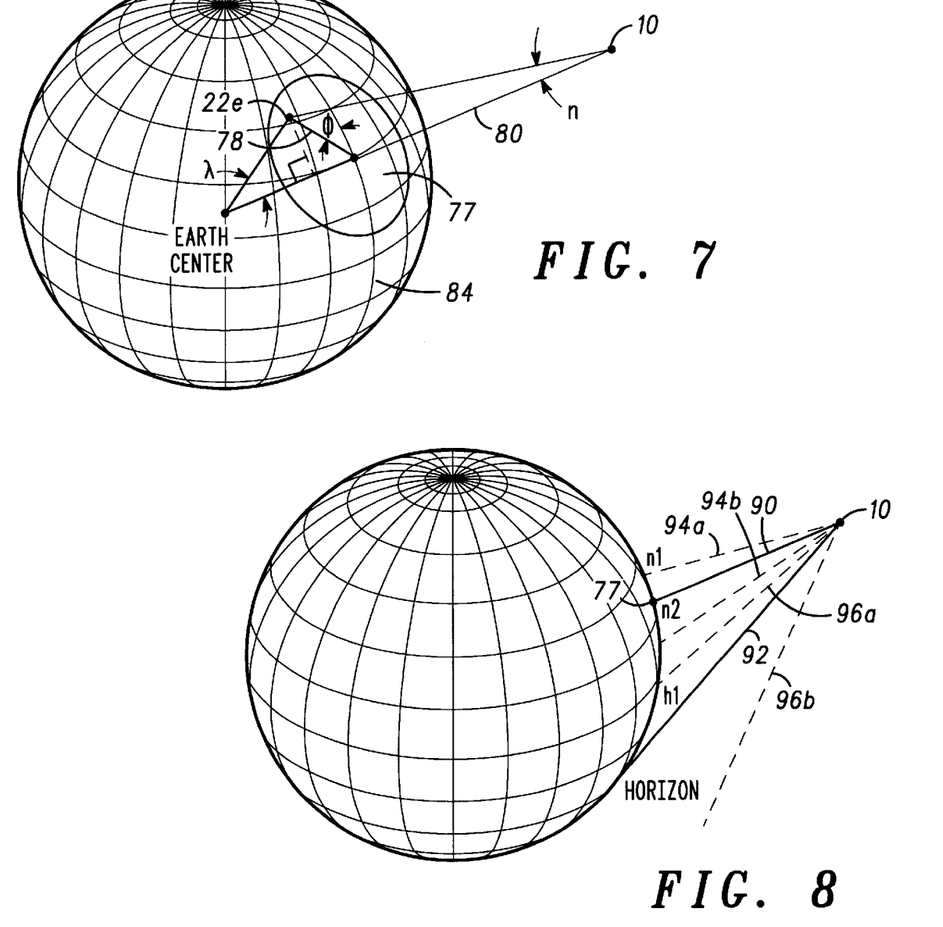
FIG. 7 illustrates the parameters used to determine beam-pointing angles from the vehicle shown in FIG. 1.
FIG. 8 illustrates the difference in the profiles of beams projected from the payload in FIG. 1 to two different surface locations.

FIG. 7 illustrates the parameters used to determine the pointing angles from the mobile emitter 18 to the center of the downlink cell 22e. An imaginary line 80 drawn from the vehicle to the center of the earth intersects the earth at a surface, or nadir, point 77. In addition to being the point directly below the vehicle relative to true north, the nadir point 77 is also the point at which the longitude and latitude of the vehicle would be measured for purposes of calculating angles and distances.

Assuming the earth is a perfect sphere, the distance from the nadir point 77 to the center of the downlink cell 22e, as well as the azimuth angle (φ) formed between a meridian line 84 and the vector 78 from the nadir point 77 to the cell 22e, can be determined. As the radius and distance from the vehicle to the center of the earth are known, both the distance from the vehicle 10 to the cell 22e and the elevation angle (η) may be calculated.

It should be noted that the radius of the earth is not only variable, but also varies in a manner that cannot be represented with a simple $2^{nd}$ or $3^{rd}$ order polynomial. For example, the North Pole is significantly closer to the gravitational center of the earth than is the South Pole. This anomaly not only requires two corrections for latitude (one for the cell 22e and one for the nadir point 77) but also requires that different corrections be applied depending on whether the latitude is positive or negative.

To avoid the above computationally intensive method of computing the radius of the earth, the beam steering device of the present invention associates a virtual radius for the earth for each of several thousand stored downlink cell addresses. Rather than provide a continuous coverage of every point on the surface of the earth, the beam steering device tiles the surface into quantifiable cells that have well-known center points. Each of the cells is defined by two subfields m, n. The subfield m is an index used to compute the longitude of the cell, while the subfield n is an index used to compute the latitude of each cell.

The generated m and n indices enable broadband devices to transmit fewer bits in data packet headers to represent a downlink cell address than if the surface was not tiled. Also, the indices can be used to generate downlink cell coordinates for determining beam steering angles in a manner that decreases the payload processing time necessary to determine such angles. In addition, the indices minimize the number of cells within the FOV 20, thereby decreasing the amount of processing necessary to tile the FOV.

The latitude and longitude of each cell is stored in a table along with the cell virtual radius. This cell latitude/longitude table is generated once and uploaded to the vehicle as a fixed table prior to vehicle deployment. As the table is generated only once and not updated dynamically, the order of the polynomial equation required to model earth oblateness is directly dependent upon the desired accuracy. Alternatively, the table may be generated using empirical data gathered from mapping missions.

It should be noted that, for the calculation used to compensate for earth oblateness, it is assumed that the distance from the center of the earth to the vehicle remains constant, even though the radius from the nadir point 80 to the vehicle 10 is not constant.

Altitude Compensation

The description in the previous section assumes that the earth—although not a perfect sphere—is at least perfectly smooth. However, the present invention also is capable of compensating for coarse altitude deviations in steering beams from the antenna 18. In other words, the present invention compensates for average altitude differences over an area of several square miles, rather than providing fine-tuned corrections. For example, the present invention does not compensate for an altitude difference between a point at the top of a cliff and another point at its base. However, the present invention is capable of compensating for altitude variations in geographic locations within the Great Plains region of the United States, as the elevation may vary gradually by as much as one mile between locations several miles apart. However, it should be obvious to those skilled in the art, that the distance between points of average altitude can be varied over any desired range, none of which is limited by the discussed invention.

Providing coarse correction for average altitude is realized in a manner similar to correcting for earth oblateness. The average height above (or below) sea level for a cell, such as the cell 22e, is calculated based on empirical mapping data. The calculated value is then added (subtracted) to (from) the virtual radius data generated to correct for the average calculated height difference for the cell. The combined virtual radius data provides a local model of a perfectly spherical, smooth earth at each cell.

Orbit Eccentricity/Non-Circular Orbital Anomaly Compensation

The distance from the vehicle to the center of the earth does not remain constant due to a variety of factors. Perhaps the two most significant factors are that the vehicle orbital path is not a perfect circle and that the earth may not be modeled as having a uniform gravity gradient.

The orbital path of any vehicle is neither a perfect circle nor a perfect ellipse. Solar wind impinging on the vehicle will cause vehicle movement, as will the passage of the vehicle through magnetic fields and the rarified upper atmosphere of the earth. The collision of the vehicle with natural and man-made objects—as well as the expenditure of fuel for station-keeping purposes—will alter both the mass and the trajectory of the vehicle.

In addition, the heterogeneous composition of the earth results in an uneven gravity field. In other words, a vehicle at a fixed distance from the center mass of the earth will experience a different force of gravity depending on the latitude and longitude of the vehicle nadir point 77. This is particularly true over oceanic sized bodies of water, with the so-called center of the Pacific Ocean exerting a significantly higher force of gravity than, say, the so-called center of the North American continent. While the amount of distortion of the gravity gradient is relatively stable over one orbit of a vehicle, it is certainly not static over periods of weeks, months, or other time durations associated with the normal life of a vehicle.

Accordingly, the beam steering device of the present invention computes the distance of a vehicle from the center of the earth at periods of one second or less, with the center of the earth being defined as the same center point used to calculate earth oblateness and average altitude above (or below) mean sea level. Calculation of the vehicle distance from this center point is done using the well-known and commercially available Geo-Positioning vehicle (GPS) system (not shown), which calculates vehicle latitude and longitude (nadir point 77), as well as vehicle distance from the center of the earth. As orbit deviations caused by gravitational variations (as well as the other above-described error effects) are relatively minor from one second to another, a simple alpha-beta or alpha-beta-gamma filter (not shown) may be used to compute vehicle parameters at periods of less than one second.

RF Beam Profile Compensation

Another compensation factor that must be included in calculating beam steering angles is the combined effect of slant range and the curvature of the earth on the power density of a beam footprint on the surface of the earth. FIG. 8 illustrates the payload 14 projecting the same-sized beam at two different locations onto the surface of the earth.

Each of the solid lines 90, 92 represents a beam center, as well as the location within each beam at which power density is the highest. The dotted lines 94a–94b, 96a–96b indicate the beam locations at which the power density of the beams 90, 92 has fallen off to one-half (3 dB) the value of the maximum. It is vital that the power density distribution within the beam be controlled so that a beam directed at one cell does not interfere with a second beam directed at an adjacent or neighboring cell and so that the maximum amount of the energy radiated covers the desired cell.

For beams directed at the nadir point 77, such as the beam 90, the density of the beam remains well behaved, with the maximum surface power density coinciding with the beam center. Note that the 3 dB points n1, n2 of the nadir beam 90 as measured on the surface are further from the vehicle than the nadir point 77 itself. As the power density drop-off is proportional to the square of the distance from the vehicle, the beams at the 3 dB points n1, n2 will actually be at less than half power because of the larger distance from those points to the vehicle.

However, as a beam is directed more and more toward the horizon, the above relation does not hold true. As depicted in the relationship between the beam 92 having a center located on the horizon, and the 3 dB point h1, the 3 dB point (in this example) is only half the distance from the vehicle as the beam center. Being only half the distance, it would be expected that the decrease in power density of the 3 dB point h1 would be only one quarter as much as the decrease in power density of the beam center. The net effect is that the 3 dB point actually has a power density twice as high as the power density at the beam center. If only a single beam was being transmitted, this parameter would not be a problem, assuming the power density at the beam center was adequate to complete a link. However, when multiple beams are being simultaneously used, this increased power has a high probability of interfering with another beam attempting to illuminate a point near h1.

Accordingly, the beam steering device of the present invention compensates for beam profile differences by correcting the distortion of the beam surface footprint as the beam is pointed at off-nadir angles. The correction is applied by first calculating the azimuth and elevation angles where the beam center would normally be pointed, then increasing the elevation angle to ensure that the surface power density is highest in the center of the specified geographic location. A simple correction is possible based solely as a function of original elevation angle. However, the present invention can be programmed to provide more accurate corrections by using the original elevation angle, as well as the virtual radius of the geographic location and instantaneous height of the vehicle as already discussed.

Dynamic Length Polynomial Trigonometric Approximation

Figure 9:
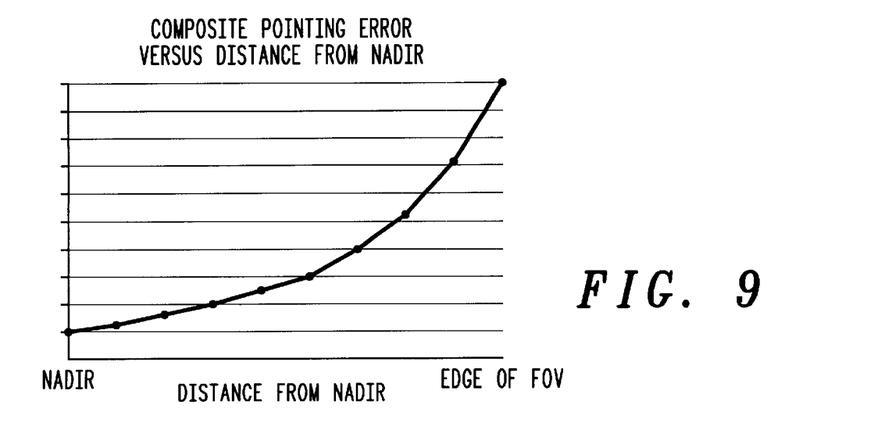
FIG. 9 is a graph of composite beam-pointing error versus nadir distance associated with the payload shown in FIG. 1.

As has been discussed, the above error effects contribute to a generalized composite error function that tends to increase with the nadir angle. As shown in FIG. 9, a generalized curve results when the composite error function is graphed versus distance from the nadir point, with the curve peaking at the outer edge of the FOV. The difference from the minimum amount of error, which typically occurs at the nadir point, often referred to as in the nadir direction, to the maximum amount of error, which tends to occur at the edge of the FOV, can be an order of magnitude.

The beam steering device of the present invention is capable of compensating for the above variations in composite error when the beam steering data calculator 64 incorporates a programmed dynamic length polynomial trigonometric approximation algorithm. The approximation algorithm significantly reduces the required amount of beam steering processing. Specifically, for downlink cells nearer to the nadir direction, fewer polynomial terms can be used in the beam steering calculations while still meeting the system error budget. In addition, the reduction of terms directly results in a reduction in total processing performance needed for the complete beam steering calculation task.

For example, it has been shown that, for an application having an order of magnitude difference in the max to min composite error function, the polynomial trigonometric approximation algorithm can reduce the number of terms required in the beam steering data sets from, for example, six for cells near the edge of the FOV, to three for cells near the nadir point. Consequently, a composite processing improvement of approximately 48% may be expected with respect to a real-time polynomial trigonometric approximation approach across the entire FOV space.

The above dynamic length polynomial trigonometric approximation algorithm is based upon automatic incremental adjustments in the number of terms used in the beam steering data sets as a function of the nadir-angle to minimize the amount of processing of the beam steering data calculator 64.

As described above, and as should now be appreciated, the beam steering device of the present invention significantly reduces the processing necessary to accurately steer vehicle RF beams to surface downlink cells by re-using beam steering data tables for a predetermined quantization time. The quantization time is application-specific and set to provide an optimum balance between beam-pointing accuracy and the frequency of beam steering data table updates. Also, the present invention further reduces system processing requirements by compensating for numerous causes of beam-pointing errors not addressed by conventional beam steering systems. In addition, the present invention further reduces system processing by truncating beam steering data set calculations when a vehicle orbit location corresponds to an orbit position requiring less beam-pointing accuracy. Implementation of the beam steering device according to the present invention on conventional LEO platforms has resulted in a 50-fold reduction in device processing, as well as a 35 kg mass reduction and a 500 W power savings.

While the above description is of the preferred embodiment of the present invention, the invention may be modified, altered, or varied without deviating from the scope and fair meaning of the following claims.

What is claimed is:

1. A method of steering a communications beam from a mobile platform, comprising:
    generating a table of beam steering data sets, said generating said table of beam steering data sets comprising:
        tiling a planetary surface into a plurality of cells;
        assign a latitude and longitude location address to each of the plurality of cells to establish cell geographical location information;
        associating a virtual planetary radius to each of the plurality of cells based on pre-loaded geographical data; and
        generating table of beam steering data sets based on the cell geographical location information established during the assigning of a latitude and longitude location address and the associating of a virtual planetary radius;
    looking up a data set from the table of beam steering data sets that corresponds to a received downlink address;
    adjusting a beam-pointing angle in response to the looked-up data set; and
    repeating looking up and adjusting at least one time based on the generated table of beam steering data sets.

2. The method of claim 1, wherein the repeating of looking up and adjusting at least one time comprises repeating looking up and adjusting a plurality of times during a predetermined quantization time period based on the generated table of beam steering data sets.

3. The method of claim 1, wherein the generating of the table of beam steering data sets includes correcting the generated beam steering data sets to compensate for at least one of vehicle orbital pitch, roll and yaw.

4. The method of claim 1, wherein the generating of the table of beam steering data sets comprises compensating for beam steering errors caused by earth surface irregularities.

5. The method of claim 1, wherein the generating of the table of beam steering data sets further comprises compensating for beam steering errors caused by satellite vehicle orbit eccentricities.

6. The method of claim 1, wherein the generating of the table of beam steering data sets further comprises compensating for beam steering errors caused by beam profile variations.

7. The method of claim 1, wherein the generating of the table of beam steering data sets comprises a-priori generating a table of beam steering data sets for future table lookup use while a table of beam steering data sets is accessible for current lookup use.

8. A method of steering a communications beam from a mobile platform comprising:
    generating a table of beam steering data sets;
    looking up a data set from the table of beam steering data sets that corresponds to a received downlink address;
    adjusting a beam-point angle in response to the looked-up data set; and
    repeating looking up and adjusting at least one time based on the generated table of beam steering data sets;
    monitoring a satellite vehicle orbital location; and truncating terms in the processing equations during the generating of the table of beam steering data sets if it is determined during the monitoring of a satellite vehicle that the series approximations used to calculate required trigonometric values converge rapidly.

9. An apparatus for steering a beam modulated from a mobile platform payload in response to a received data packet including a downlink address, the apparatus comprising:
    a beam steering data calculator for a-priori generating data sets of a beam steering data table for possible downlink addresses within an upcoming payload field of view, the beam steering data calculator also for truncating a-priori generation of the data sets if it is determined that a future orbital location corresponding to the a-priori generated beam steer data table has a predetermined higher degree of error tolerance; and
    a data table server for providing continuous lookup access to a current beam steering data table during a predetermined quantization time period, to enable a beam steering data set corresponding to the received data packet downlink address to be selected for beam steering use and for queuing the a-prioi-generated beam steering data table behind the current beam steering data table for future lookup use after expiration of the predetermined quantization time period.

10. The apparatus of claim 9, further comprising an interface for looking up a beam steering data set from the current beam steering lookup table corresponding to the received downlink address, and for subsequently outputting the looked-up beam steering data set from the data table server with the data packet for transmission to the downlink address.

11. The apparatus of claim 9, wherein the beam steering data calculator is for generating the beam steering data tables over a quantifiable period.

12. The apparatus of claim 9, wherein the beam steering data calculator is for a-priori generating data sets including beam steering azimuth and nadir angles for all of the possible downlink addresses.

13. The apparatus of claim 12, wherein the beam steering data calculator is for a-priori generating the beam steering data table to compensate for at least one of payload pitch, roll and yaw.

14. The apparatus of claim 9, wherein the beam steering data calculator is for a-priori generating the beam steering data table to compensate for beam steering errors caused by surface irregularities.

15. The apparatus of claim 9, wherein the beam steering data calculator is for a-priori generating the beam steering data table to compensate for beam steering errors caused by platform movement eccentricities.

16. The apparatus of claim 9, wherein the beam steering data calculator is for a-priori generating the beam steering data table to compensate for beam steering errors caused by variations in beam profiles.

17. An apparatus for steering a beam modulated from a mobile platform payload in response to a received data packet including a downlink address, the apparatus comprising:

a beam steering data calculator for a-priori generating data sets of a beam steering data table for possible downlink addresses within an upcoming payload field of view, the beam steering data calculator is also for storing preloaded geographical location address surface data, tiling a reference surface into a plurality of cells by assigning a latitude and longitude address to a center of each of the plurality of cells based on pre-loaded geographical location address surface data, and steering a beam to a cell center corresponding to the downlink address in response to the selected beam steering data set; and a data table server for providing continuous lookup access to a current beam steering data table during a predetermined quantization time period, to enable a beam steering data set corresponding to the received data packet downlink address to be selected for beam steering use and for queuing the a-priori-generated beam steering data table behind the current beam steering data table or future lookup use after expiration of the predetermined quantization time period.

* * * * *